United States Patent
Mignone

(10) Patent No.: US 7,175,519 B2
(45) Date of Patent: Feb. 13, 2007

(54) ELASTIC BAND FOR TYING CHICKENS AND LIKE ANIMALS TO BE COOKED

(75) Inventor: Giuseppe Mignone, deceased, late of Cisterna d'Asti (IT); by Adriana Mignone, legal representative, Cisterna d'Asti (IT)

(73) Assignee: FRA Production SpA, Cisterna d'Asti (IT)

(*) Notice: Subject to any disclaimer, the term of this patent is extended or adjusted under 35 U.S.C. 154(b) by 12 days.

(21) Appl. No.: 10/487,196

(22) PCT Filed: Feb. 8, 2002

(86) PCT No.: PCT/EP02/01561

§ 371 (c)(1),
(2), (4) Date: Nov. 19, 2004

(87) PCT Pub. No.: WO03/017772

PCT Pub. Date: Mar. 6, 2003

(65) Prior Publication Data

US 2005/0124278 A1    Jun. 9, 2005

(30) Foreign Application Priority Data

Aug. 24, 2001  (IT)  .......................... TO20010152 U

(51) Int. Cl.
*A22C 21/00*  (2006.01)

(52) U.S. Cl. ..................................................... 452/188
(58) Field of Classification Search ................ 452/174, 452/188; 57/225, 226; 132/222, 273; 24/300, 24/715.3

See application file for complete search history.

(56) References Cited

U.S. PATENT DOCUMENTS

| | | | | |
|---|---|---|---|---|
| 1,719,555 | A * | 7/1929 | Lewis et al. ................ | 132/222 |
| 2,324,989 | A * | 7/1943 | Alderfer ..................... | 57/207 |
| 3,098,347 | A * | 7/1963 | Smith ......................... | 57/225 |
| 3,375,655 | A * | 4/1968 | Swales, Jr. ................. | 57/211 |
| 3,828,544 | A * | 8/1974 | Alker ......................... | 57/210 |
| 4,777,784 | A * | 10/1988 | Ferguson .................... | 54/34 |
| 5,816,905 | A * | 10/1998 | Marchese ................... | 452/174 |
| 6,000,408 | A * | 12/1999 | Maturaporn ................ | 132/273 |
| 6,047,708 | A * | 4/2000 | Panel et al. ................. | 132/273 |
| 6,581,366 | B1 * | 6/2003 | Andrews .................... | 57/225 |

* cited by examiner

*Primary Examiner*—Thomas Price
(74) *Attorney, Agent, or Firm*—Carlson, Gaskey & Olds

(57) ABSTRACT

The invention concerns an elastic band (11) for tying chickens (31) and other animals to be cooked, which band has an "8"-shape where a first and smaller loop (13) and a second and larger loop (15) are defined, the first and smaller loop being intended for tying the animal's legs (33) and the second and larger loop being intended for tying the neck (35).

17 Claims, 3 Drawing Sheets

ELASTIC BAND FOR TYING CHICKENS AND LIKE ANIMALS TO BE COOKED

BACKGROUND OF THE INVENTION

The present invention relates to an elastic band for tying chickens and like animals to be cooked.

Use of loop-shaped elastic bands for tying chickens and other birds to be cooked, in particular to be roasted, is known in the art.

According to the prior art, shown in FIGS. 1a and 1b, loop-shaped elastic bands 3 are made by one or more elastic wires 1 covered by a spiral-wound wire 5 of cotton or other synthetic fibres.

That loop-shaped elastic band is in general obtained by tying both ends of a piece of said elastic wire, so as to obtain the loop shape 7.

In such manner, elastic loops of different sizes can be made, suitable for tying birds of different sizes, such as chickens, turkeys and so on.

The known elastic loops are used to hold the bird legs and the wings together.

FIG. 1b shows a chicken tied with a conventional loop-shaped elastic band 3.

That kind of elastic bands is used by first making legs 33 of chicken 31 enter loop 7; subsequently, after having turned the loop by 180°, chicken neck 35 is introduced into the loop.

Thus, as clearly shown in FIG. 1b, chicken legs 33 are held together by a first portion 8 of the elastic loop, whereas the remaining portion 9 passes around chicken neck 35.

The above description clearly shows that using a conventional elastic band 3 for tying chickens and similar animals entails a twisting movement of the operator's forearm and wrist to form the second loop portion 9, which is to pass around the neck and to push wings 37 against the animal's body.

Such a movement is repeated many and many times, about ten times per minute, in wrapping operations at industrial level.

On the long term, such a frequent repetition of the twisting movement of the forearm and wrist may cause soreness and pain, so that the operator is compelled to stop working.

SUMMARY OF THE INVENTION

It is an object of the present invention to overcome the above drawbacks of the prior art, by providing an elastic means for tying chickens and the like to be cooked, in particular to be roasted, which means is also easy to manufacture and maintains the advantages of cheapness of the conventional system.

The essential feature of the present invention will become apparent from the appended claims.

BRIEF DESCRIPTION OF THE INVENTION

The invention will be now described in detail with particular reference to the accompanying drawings, given only by way of non limiting example, in which:

FIGS. 1a and 1b show the loop-shaped elastic band according to the prior art;

FIGS. 2a and 2b show the loop-shaped elastic band according to the present invention;

FIG. 3 is a schematic view of the elastic band shown in FIG. 2a.

DETAILED DESCRIPTION OF THE PREFERRED EMBODIMENT

Figures 1A, 2A, 3:
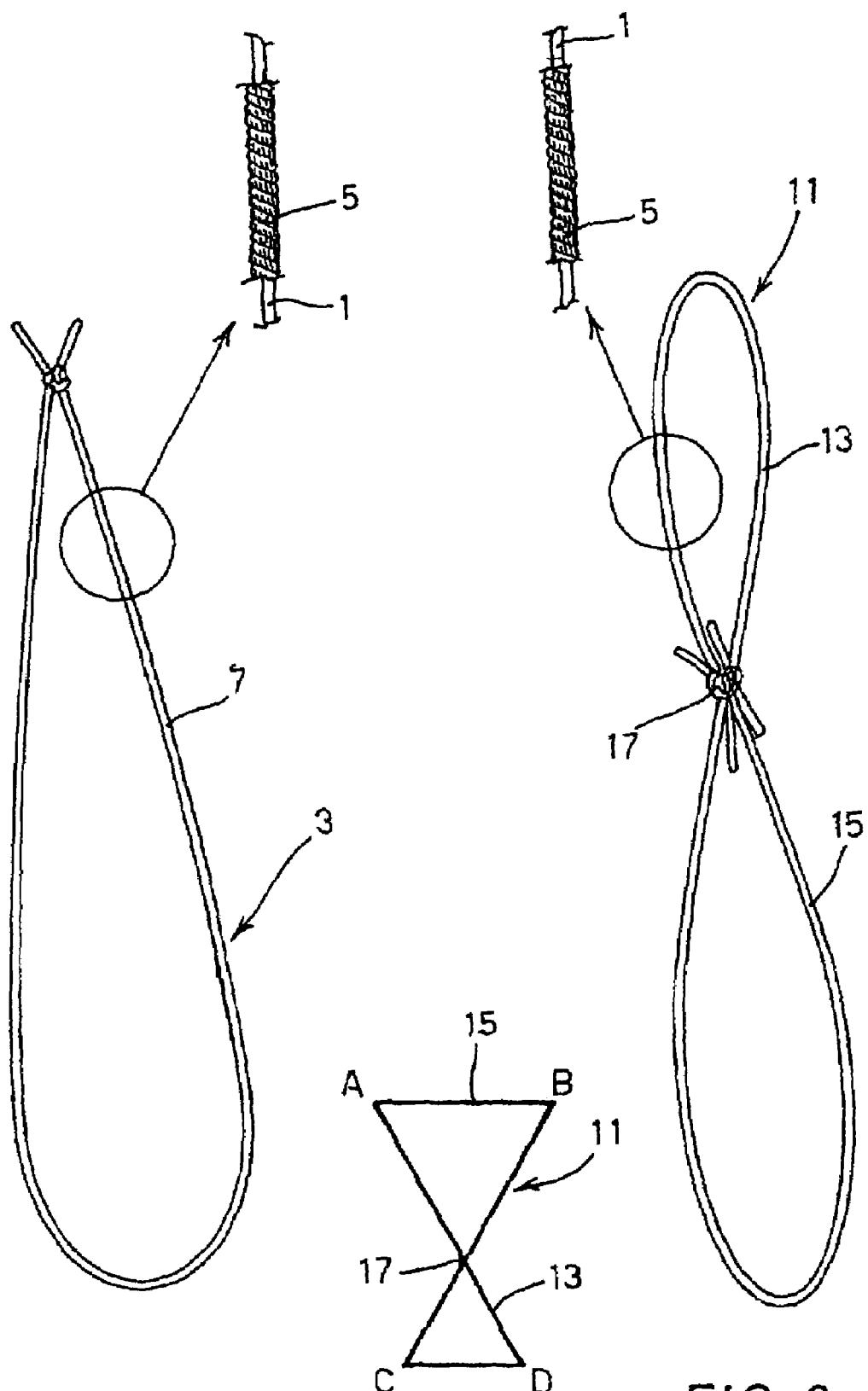
Figure 2B:
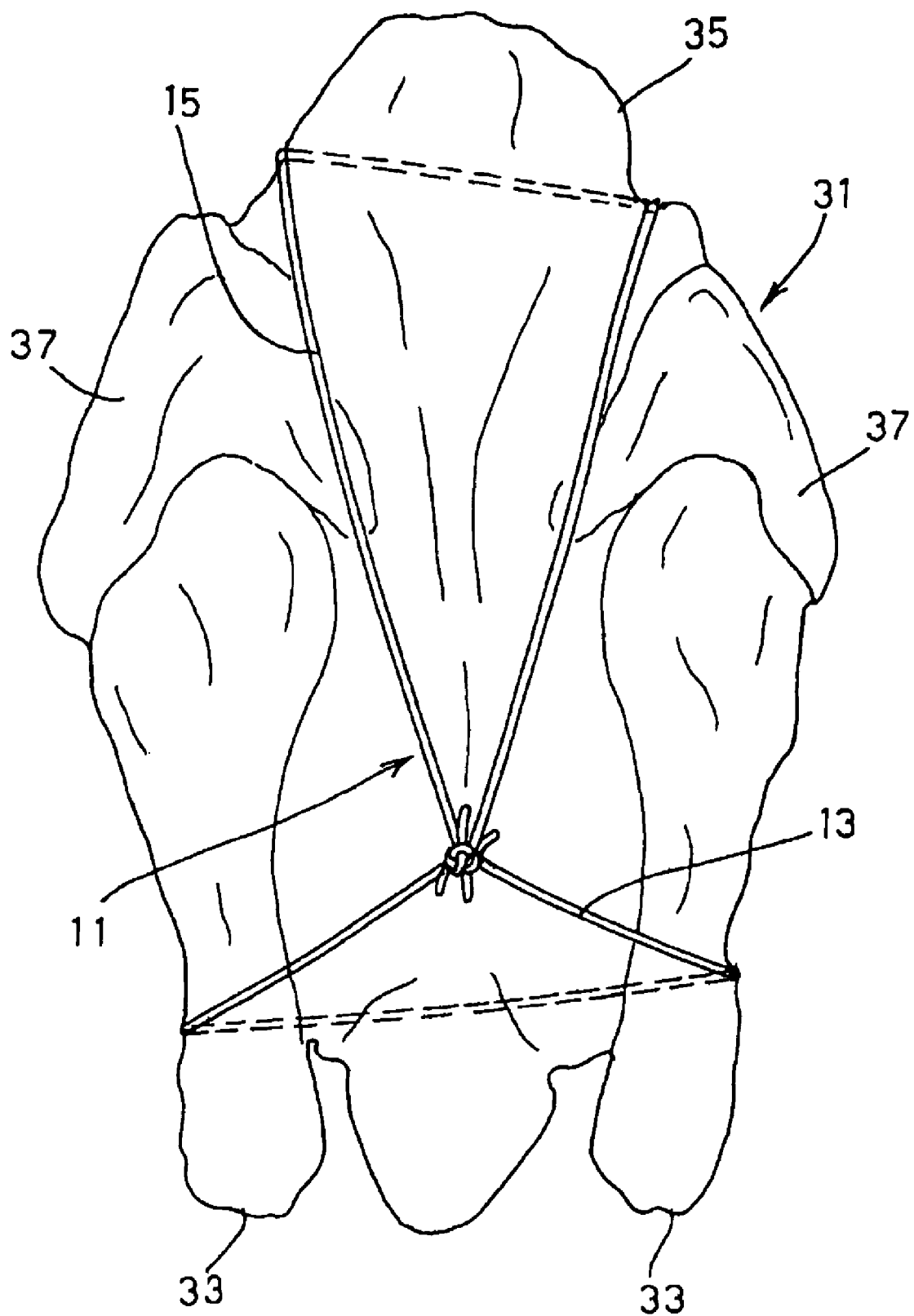

As it clearly appears from FIGS. 2a and 2b, elastic band 11 according to the invention is made in an "8"-shape where two different portions are defined: a first portion or small loop 13 of smaller diameter, and a second portion or large loop 15 of larger diameter.

In the alternative, elastic band 11 could be obtained by coupling two elastic loops of the same diameters but of different moduli of elasticity.

Each loop of elastic band 11 according to the invention could be made by one or more elastic wires 1 covered by a spiral-wound wire 5 of cotton or other synthetic fibres.

Moreover, the "8"-shape of elastic band 11 according to the invention could be obtained in different manners, e.g. by tying together the four ends of two pieces of elastic wire with different lengths, or with the same lengths but different elasticity.

When the "8"-shaped elastic band according to the invention is used, legs 33 of chicken 31 are introduced into small loop 13, which is arranged to exert a greater return force; subsequently, without any need for somehow rotating the elastic band, but by means of a pulling movement only, chicken neck 35 is made to pass through large loop 15. Thus, as clearly shown in FIG. 2b, chicken legs 33 and wings 37 are firmly held against the chicken body.

Referring also to FIG. 3, it can be appreciated that such a result is primarily attained because the return force exerted by the elastic band between chicken neck 35 and the chicken tail, that is, in longitudinal direction with respect to the animal's body, is converted, thanks to knot 17, into a converging action transversally directed towards chicken legs 33 (corners C–D in FIG. 3) and wings 37 (corners A–B).

Figure 1B:
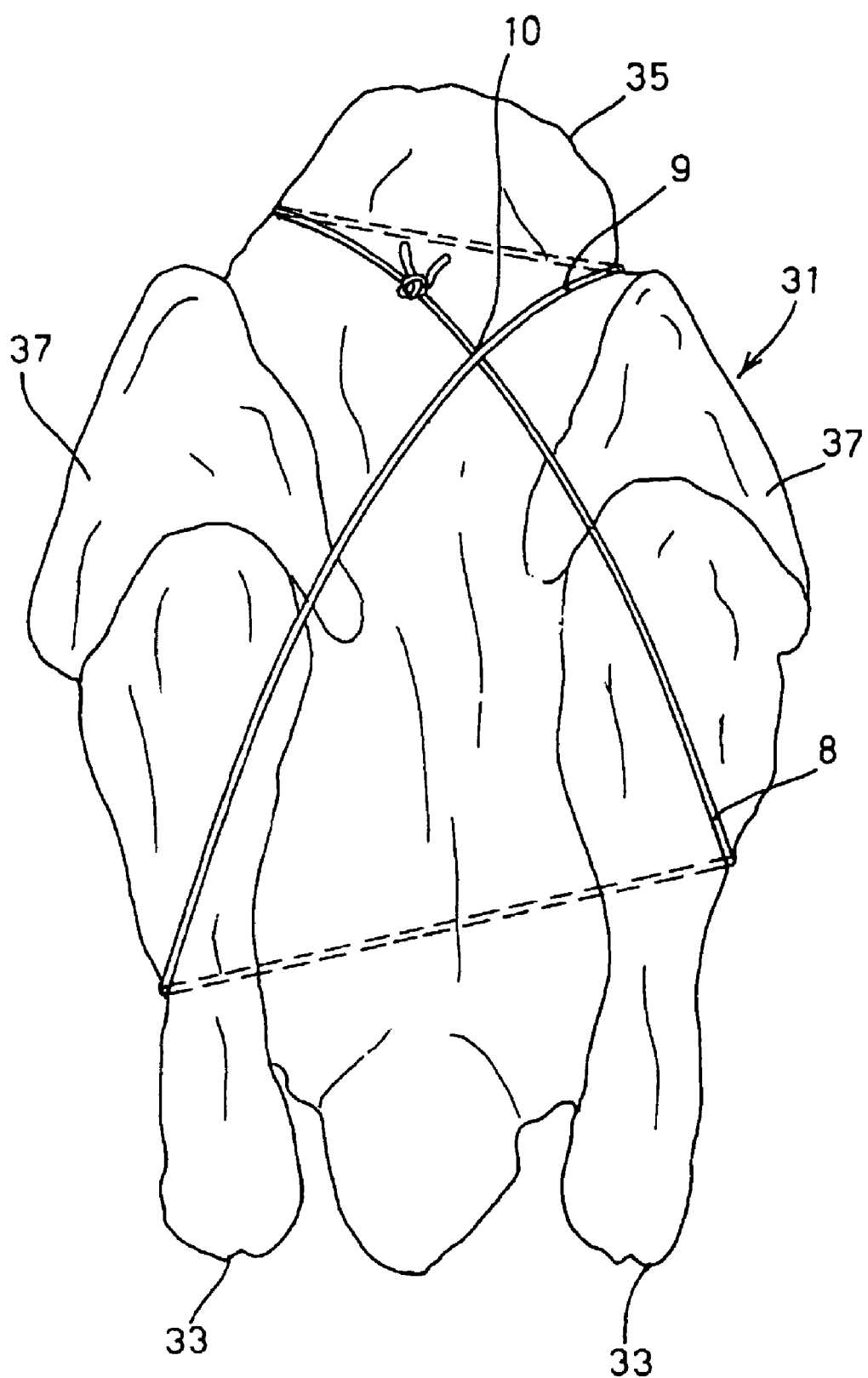

Advantageously, the different sizes of loops 13, 15, or their different moduli of elasticity, act so that the junction point of the loops, corresponding with knot 17, is located at the rear area of the chicken, as shown in FIG. 2b, contrary to what happened with the conventional loop in the prior art: this can be clearly seen by comparing the position of knot 17 in FIG. 2b to the position of cross point 10 in FIG. 1b.

Advantageously, according to the invention, a greater practicality in the use of the elastic band for tying birds to be cooked can be obtained, while increasing the wrapping speed in industrial application.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

The invention claimed is:

1. An elastic band (11) for tying chickens or other animals (31) to be cooked, said band comprising:
    a wire (1) of elastic material, including a junction point (17) that defines an "8"–shape.

2. The elastic band according to claim 1, wherein the two loops (13, 15) defined in said "8"-shaped elastic band have different diameters.

3. The elastic band according to claim 2, wherein said elastic band (11) comprises two pieces of elastic wire of different lengths, joined at the respective ends.

4. The elastic band according to claim 3, wherein said elastic band (11) comprises two pieces of elastic wire with the same lengths but different elasticity, joined at the respective ends.

5. The elastic band according to claim 1, wherein the wires in the two loops (13, 15) defined in said "8"-shaped elastic band have different moduli of elasticity.

6. The elastic band according to claim 1, wherein said wire (5) covering the elastic wire (1) is made of cotton.

7. The elastic band according to claim 1, wherein said wire (5) covering the elastic wire (1) is made of synthetic wire.

8. The elastic band according to claim 1, wherein said wire (1) of elastic material is covered by a spiral-wound wire (5) of a different material.

9. The elastic band according to claim 1, wherein the junction (17) comprises a knot connecting portions of the wire together.

10. A method for tying chickens or other animals to be cooked, said method comprising the steps of:
   a) providing and "8"-shaped elastic band having first and second loops and a junction point (17) therebetween so as to define an "8"-shaped elastic band; and
   b) pulling the "8" shaped elastic band such that the chicken neck is made to pass through the second loop of the "8" shaped elastic band.

11. The method as recited in claim 10, wherein the first and second loops defined in the "8" shaped elastic band have different diameters, and wherein the legs of the chicken are introduced into the smaller of the first and second loops and the neck is made to pass through the larger of the first and second loops.

12. The method as recited in claim 10, wherein said "8"-shaped elastic band is covered by a spiral-wound wire of material different than the elastic band.

13. The method as recited in claim 10 wherein said junction point (17) comprise a knot in said "8" shaped elastic band.

14. A band for wrapping poultry during cooking comprising:
   a first end;
   a second end secured to the first end; and
   a junction securing the band to itself at a location between the first and second ends.

15. The band as recited in claim 14, wherein the junction secures the band to define a first loop portion and a second loop portion.

16. The band as recited in claim 14, wherein the junction comprises a knot securing portions of the band together.

17. The band as recited in claim 15, wherein the first loop and the second loop define a length of the band, wherein the first loop is of a greater length than the second loop.

* * * * *